US012694251B1

(12) United States Patent
Whitney et al.

(10) Patent No.: US 12,694,251 B1
(45) Date of Patent: Jul. 28, 2026

(54) VOICE-CONTROLLED, AI-ENABLED DEVICE AND SYSTEM FOR PERSONALIZED STICKER CREATION AND INTERACTIVE SHARING

(71) Applicant: Hapiko Inc., Brooklyn, NY (US)

(72) Inventors: Robert Whitney, Brooklyn, NY (US); Arun Gupta, Brooklyn, NY (US)

(73) Assignee: Hapiko Inc., Brooklyn, NY (US)

( * ) Notice: Subject to any disclaimer, the term of this patent is extended or adjusted under 35 U.S.C. 154(b) by 0 days.

(21) Appl. No.: 19/358,908

(22) Filed: Oct. 15, 2025

Related U.S. Application Data

(60) Provisional application No. 63/799,105, filed on May 2, 2025.

(51) Int. Cl.
| | |
|---|---|
| *G06K 15/02* | (2006.01) |
| *G06F 3/12* | (2006.01) |
| *H04N 1/00* | (2006.01) |

(52) U.S. Cl.
CPC ....... *G06K 15/1856* (2013.01); *G06F 3/1208* (2013.01); *G06F 3/1256* (2013.01); *G06F 3/1285* (2013.01); *G06K 15/024* (2013.01); *G06K 15/028* (2013.01); *H04N 1/00403* (2013.01); *H04N 1/00384* (2013.01); *H04N 1/00411* (2013.01)

(58) Field of Classification Search
CPC ............. G06K 15/1856; G06K 15/024; G06K 15/028; G06F 3/1208; G06F 3/1256; G06F 3/1285; H04N 1/00403; H04N 1/00384; H04N 1/00411
See application file for complete search history.

(56) References Cited

U.S. PATENT DOCUMENTS

| | | | | |
|---|---|---|---|---|
| 7,009,728 | B1* | 3/2006 | Hara .................. | H04N 1/00175 |
| | | | | 358/1.16 |
| 10,192,222 | B2 | 1/2019 | Witkin et al. | |
| 2004/0114193 | A1* | 6/2004 | Inage .................... | G06T 11/001 |
| | | | | 358/1.15 |
| 2007/0076255 | A1* | 4/2007 | Hamashima ............ | G06F 3/128 |
| | | | | 358/1.9 |
| 2007/0136208 | A1* | 6/2007 | Hamashima ........... | B41J 11/003 |
| | | | | 705/62 |
| 2010/0255904 | A1 | 10/2010 | Kidakarn et al. | |
| 2023/0191268 | A1 | 6/2023 | Engelhard | |
| 2025/0110655 | A1 | 4/2025 | Kotra et al. | |
| 2025/0133169 | A1* | 4/2025 | Sakaguchi ......... | H04N 1/00403 |

(Continued)

*Primary Examiner* — Nicholas Pachol
(74) *Attorney, Agent, or Firm* — Van Pelt, Yi & James LLP

(57) ABSTRACT

A device includes a housing, a microphone module, a processor, a memory, and a thermal printer module. The microphone module within the housing is configured to capture voice inputs including a voice command. The processor and memory are within the housing. The processor is configured to: receive the voice command from a user; provide the voice command to convert the voice command to text; receive the text; provide the text to generate an image, wherein the image is generated taking into account saved personalized characters or saved personalized images from the user; and receive the image. The thermal printer module is within the housing. The thermal printer module is configured to: print one or more stickers, one or more printed sheets, or one or more stickers and one or more printed sheets including the image.

20 Claims, 10 Drawing Sheets

(56)　　　　　　References Cited

U.S. PATENT DOCUMENTS

| 2025/0306812 | A1* | 10/2025 | Tsuruyama | ............ | H04N 1/603 |
| 2025/0307584 | A1* | 10/2025 | Tsuruyama | ............ | G06T 11/20 |
| 2025/0310449 | A1* | 10/2025 | Tsuruyama | ........... | G06F 3/1265 |

* cited by examiner

VOICE-CONTROLLED, AI-ENABLED DEVICE AND SYSTEM FOR PERSONALIZED STICKER CREATION AND INTERACTIVE SHARING

CROSS REFERENCES TO RELATED APPLICATIONS

This application is related to and claims priority from the following U.S. patents and patent applications. This application claims priority to and the benefit of U.S. Provisional Application No. 63/799,105, filed May 2, 2025, which is incorporated herein by reference in its entirety.

BACKGROUND OF THE INVENTION

1. Field of the Invention

The present invention relates to interactive toys and thermal printing devices, and more particularly to devices utilizing artificial intelligence (AI) to generate and print customized stickers.

2. Description of the Prior Art

It is generally known in the prior art to provide small handheld printers.

Prior art patent documents include the following:

U.S. Pat. No. 10,192,222 for Internet-based method and system for making user-customized die-cut stickers by inventors Witkin et al., filed Mar. 30, 2010 and issued Jan. 29, 2019, discloses an internet-based method and system for creating and printing sheets of more customized stickers. The system includes, a database of assets stored on a central server accessible via the internet, wherein the assets are graphic images, objects and text that can be accessed and manipulated by a user at a remote location. A user interface provides the user with a canvas corresponding to the sheet of stickers, asset tools to access, select and save assets that are used to create the stickers, asset transformation tools to manipulate the assets on the canvas, and die-cut tools to create die-cut borders surrounding each of the stickers. Once the sheet of stickers has been created, the user can place an order for the sheet to be printed and delivered to the user.

US Patent Pub. No. 2010/0255904 for Internet-based method and system for making user-customized die-cut stickers by inventors Witkin et al., filed Mar. 30, 2010 and published Oct. 7, 2010, discloses a method for making photo-sticker via the game consoles, wherein the method includes the steps of (a) providing a game console; (b) installing an editing software to a storage of the game console; (c) inputting an image to the storage for being edited; (d) executing the editing software by a processing system; (e) editing the inputted image to be a photo-sticker via an interface of the editing software; and (f) transmitting the edited image of photo-sticker to a printing device, so as to make the photo-sticker. The editing software installed into the game console as an add-on function allows the user to simply, inexpensively, and portably make the photo-sticker via the enjoyable game console.

US Patent Pub. No. 2025/0110655 for Apparatuses and methods for making 3d stickers, 3d cards, jewelry and buttons by inventor Osnato, filed Jul. 3, 2024 and published Jan. 9, 2025, discloses kids creating a new dimension of fun with 3D stickers using a 3D sticker maker. The 3D stickers can be personalized with sprinkles, glitter, and gem mix-ins! The 3D stickers can be used to decorate notebooks, journals, and cards. The 3D stickers can be shared with friends. Kits incorporating the 3D sticker maker can further include thirty sticker blisters, thirty sticker backgrounds, thirty double-sided sticker adhesives, one sprinkle packet, two glitter packets, two hundred and fifty gems, and instructions for using the 3D sticker maker and other components included in the kit.

US Patent Pub. No. 2023/0191268 for Personalized toy figure and method for creating the toy figure from a digital image by inventor Engelhard, filed Dec. 16, 2022 and published Jun. 22, 2023, discloses personalized toy figures and methods of making personalized figures using a digital image.

SUMMARY OF THE INVENTION

The present invention relates to interactive toys and thermal printing devices, and more particularly to devices utilizing artificial intelligence (AI) to generate and print customized stickers.

It is an object of this invention to provide a fun, interactive toy operable to print custom stickers with personalized and unique images utilizing AI generation capabilities.

In one embodiment, the present invention is directed to a voice-controlled device, including a housing including a processor and a memory, a thermal printer module within the housing, a microphone module within the housing configured to capture voice inputs, an artificial intelligence module configured to process the voice inputs and generate at least one image based on the voice inputs, and a display screen on the housing configured to display image previews of the at least one image, wherein the thermal printer module prints one or more stickers including the at least one image.

In another embodiment, the present invention is directed to a method for generating personalized sticker images, including receiving, by a microphone module within a device housing, voice inputs, processing, by an artificial intelligence module, the voice inputs and generating at least one image based on the voice inputs, displaying, by a display screen on the device housing, image previews of the at least one image, and printing, by a thermal printer module in the device housing, one or more stickers including the at least one image.

In yet another embodiment, the present invention is directed to a system for creating customized stickers, including a device, including a housing, in network communication with at least one server and at least one user device, a thermal printer module within the housing, an artificial intelligence module of the at least one server configured to process user inputs and generate at least one image based on the user inputs, and a display screen on the housing configured to display image previews of the at least one image, wherein the device is operable to receive user generated images from the at least one user device, and wherein the thermal printer module prints one or more stickers including the at least one generated image and/or the user generated images.

These and other aspects of the present invention will become apparent to those skilled in the art after a reading of the following description of the preferred embodiment when considered with the drawings, as they support the claimed invention.

DETAILED DESCRIPTION

Figure 1A:
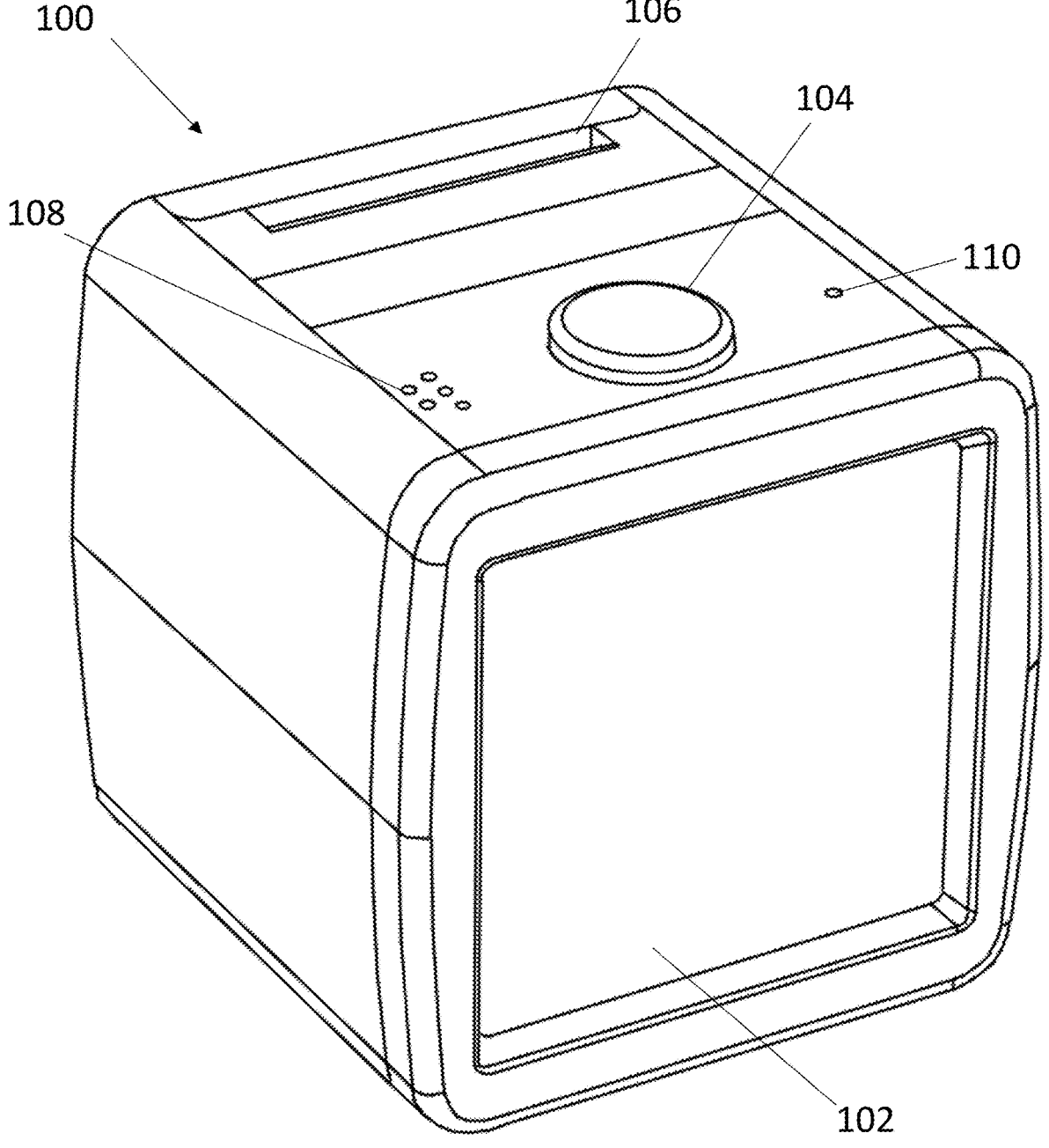
FIG. 1A illustrates a front perspective view of a device for printing customized stickers according to one embodiment of the present invention.

The present invention is generally directed to interactive toys and thermal printing devices, and more particularly to devices utilizing artificial intelligence (AI) to generate and print customized stickers.

In one embodiment, the present invention is directed to a voice-controlled device, including a housing including a processor and a memory, a thermal printer module within the housing, a microphone module within the housing configured to capture voice inputs, an artificial intelligence module configured to process the voice inputs and generate at least one image based on the voice inputs, and a display screen on the housing configured to display image previews of the at least one image, wherein the thermal printer module prints one or more stickers including the at least one image.

In another embodiment, the present invention is directed to a method for generating personalized sticker images, including receiving, by a microphone module within a device housing, voice inputs, processing, by an artificial intelligence module, the voice inputs and generating at least one image based on the voice inputs, displaying, by a display screen on the device housing, image previews of the at least one image, and printing, by a thermal printer module in the device housing, one or more stickers including the at least one image.

In yet another embodiment, the present invention is directed to a system for creating customized stickers, including a device, including a housing, in network communication with at least one server and at least one user device, a thermal printer module within the housing, an artificial intelligence module of the at least one server configured to process user inputs and generate at least one image based on the user inputs, and a display screen on the housing configured to display image previews of the at least one image, wherein the device is operable to receive user generated images from the at least one user device, and wherein the thermal printer module prints one or more stickers including the at least one generated image and/or the user generated images.

Children increasingly engage in passive digital media consumption, limiting opportunities for active, imaginative, and tactile creative expression. Existing digital and physical toys generally fail to integrate personalized creative interactions, immediate tangible outputs, and digital connectivity. The present invention addresses these limitations by combining voice-driven, personalized AI image generation with immediate physical printing and interactive digital sharing capabilities.

Referring now to the drawings in general, the illustrations are for the purpose of describing one or more preferred embodiments of the invention and are not intended to limit the invention thereto.

Figure 1B:
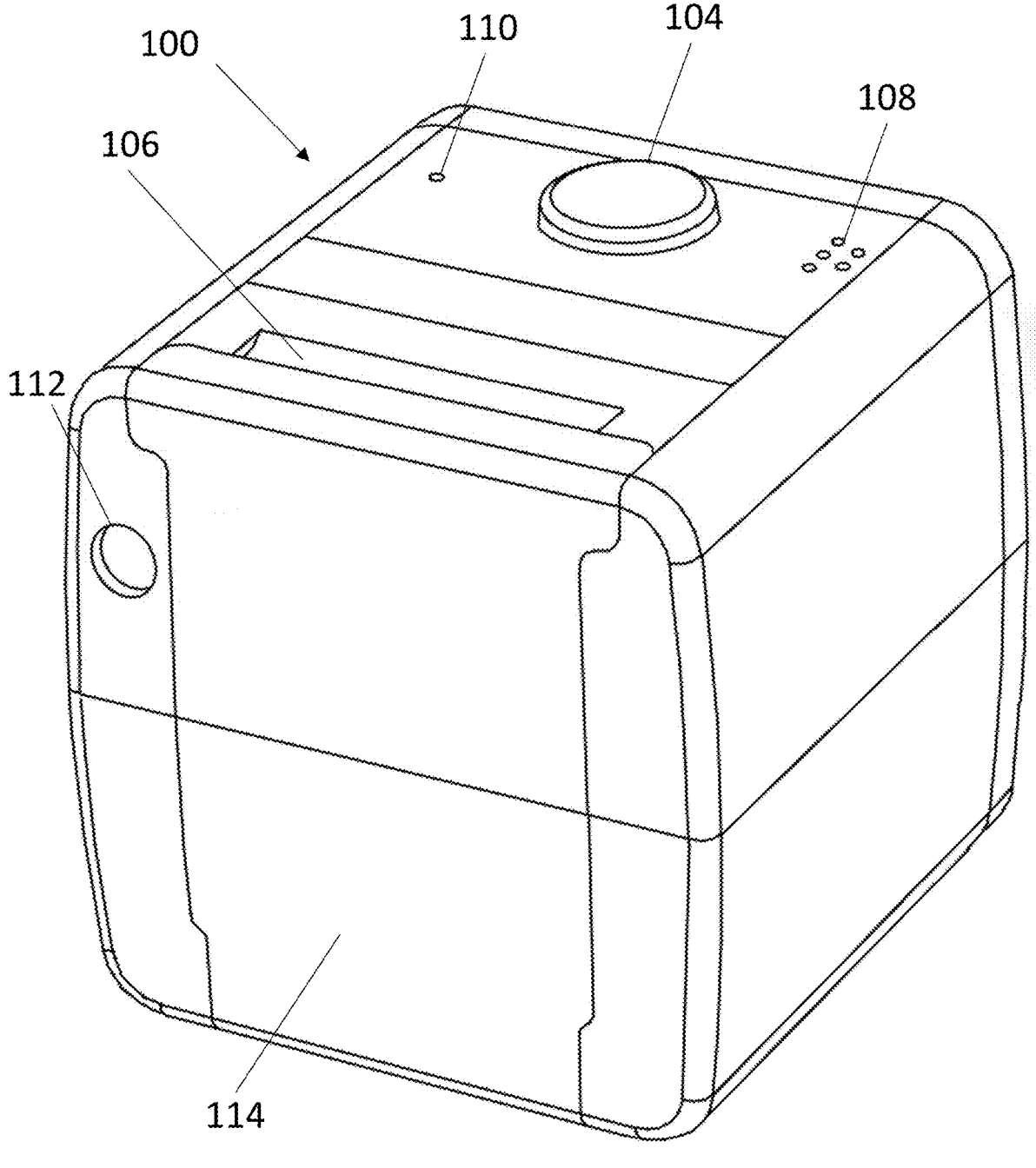
FIG. 1B illustrates a rear perspective view of a device for printing customized stickers according to one embodiment of the present invention.

As shown in FIGS. 1A and 1B, the present invention includes a housing with a compact casing. In one embodiment, the casing measures approximately 3.5×3.75×3.75 inches, and is adaptable to different colors, shapes, and licensing customizations. In one embodiment, the device is externally powered. In one embodiment, the device is battery powered via one or more batteries. The one or more batteries are operable to be rechargeable batteries or disposable batteries. Additionally or alternatively, the device is operable to be powered by a power cord connected to a conventional wall outlet (e.g., a 120 V outlet). In another embodiment, the device is operable to be solar powered via one or more solar panels. In one embodiment, the device includes a display for image previews and user feedback. In one embodiment, the display is a standard 3.92-inch diagonal color LCD display. In one embodiment, the display includes capacitive touch capabilities for enhanced user interaction and future navigation features. In one embodiment, an integrated speaker provides audio interaction cues and confirmations, enhancing user engagement and accessibility.

In one embodiment, the device is a small handheld device including three main components, namely a display and related electronics, a printer and related mechanical and electrical components, and communication electronics for communicating with one or more user devices and/or server computers. The printer and its associated components are necessary components for the system to be able to print stickers. On the other hand, in one embodiment, the inclusion of the display is limited to only specific versions of the device (e.g., premium versions) and versions of the device do not include the display. Alternatively, the device is operable to include a low resolution display, such as 8×8 light emitting diode (LED) matrix. In another embodiment, the device does not include an integrated display but is operable to communicate with a user device to display content on the display of a user device, such as a phone, tablet, or laptop computer. In another embodiment, the device does not include an integrated display but includes a projector to project an image or video onto a surface.

In one embodiment, the display is operable to play a video or show a series of images in succession based on user input, with one or more frames or images selectable by a user to print. The video or series of images is operable to be modified based on user input or interaction with the device. In one embodiment, the communication electronics are also limited to only specific versions of the device, with others able to receive voice input and generate images for printing stickers solely based on processors within the device itself. In one embodiment, the device is operable to generate a song or other audio (e.g., a voice conversation) based on user prompts by the user, allowing for both audio and visual enjoyment of the device.

FIGS. 1A and 1B show that the device 100 includes a display 102 configured to show preview versions of images generated that are to be printed on stickers produced by the device 100. The device 100 includes a button 104 able to used for a variety of purposes. In one embodiment, the button 104 is able to turn the device on or off. In one embodiment, the button 104 is able to act as a dial and is able to be used to cycle through multiple generated images (either all from the same prompt or from different previous prompts) such that an image to be printed is able to be selected. In one embodiment, the button 104 provides input to confirm an image for printing where pressing the button 104 causes a sticker with the image on it to begin printing. In one embodiment, the button 104 is able to serve as a microphone activation button, wherein pressing the button causes the microphone 110 to begin to be able to receive audio input. One of ordinary skill in the art will understand that some embodiments of the device 100 are able to include multiple buttons serving the different functionality provided above. One of ordinary skill in the art will understand that while printing stickers is a preferred embodiment, embodiments printing printed sheets with the image but without any adhesive backing (i.e., not stickers) are also contemplated herein. Examples of printed sheets include paper sheets, canvas sheets, metal sheets, fabric sheets, and any other sheets operable to receive ink from a printer. The sheets are also operable to include holographic sheets in one embodiment.

In one embodiment, the device 100 includes at least one internal speaker 108 configured to generate audio prompts and/or audio feedback for different actions of the device 100. For example, in one embodiment, the speaker 108 plays sounds or music as printing occurs to increase engagement. In one embodiment, the speaker 108 plays natural language prompts for information or follow up questions to user prompts upon receiving information from an internal processor. In an alternative embodiment, the device does not include a speaker.

The device 100 includes a printer slot 106 that serves as an opening through which created stickers are released from the device 100. The printer slot 106 is shaped and sized appropriately to allow for release of the stickers.

In one embodiment, a back side of the device 100 includes at least one power connector 112 configured to connect with a power cable to allow for powering the device 100 via external power sources (e.g., external batteries, grid power, etc.). In another embodiment, the device 100 is operable to be powered via one or more internal batteries. One of ordinary skill in the art will understand that the type, number, and size of the internal batteries used are not intended to be limiting and are selected based on the power requirements and overall size of the device 100.

In one embodiment, the device 100 includes a back panel 114 able to be opened (e.g., pivotably opened, fully detached, etc.) in order to allow for replacement or installation of printer paper for the thermal printer in order to create the stickers.

Figure 1C:
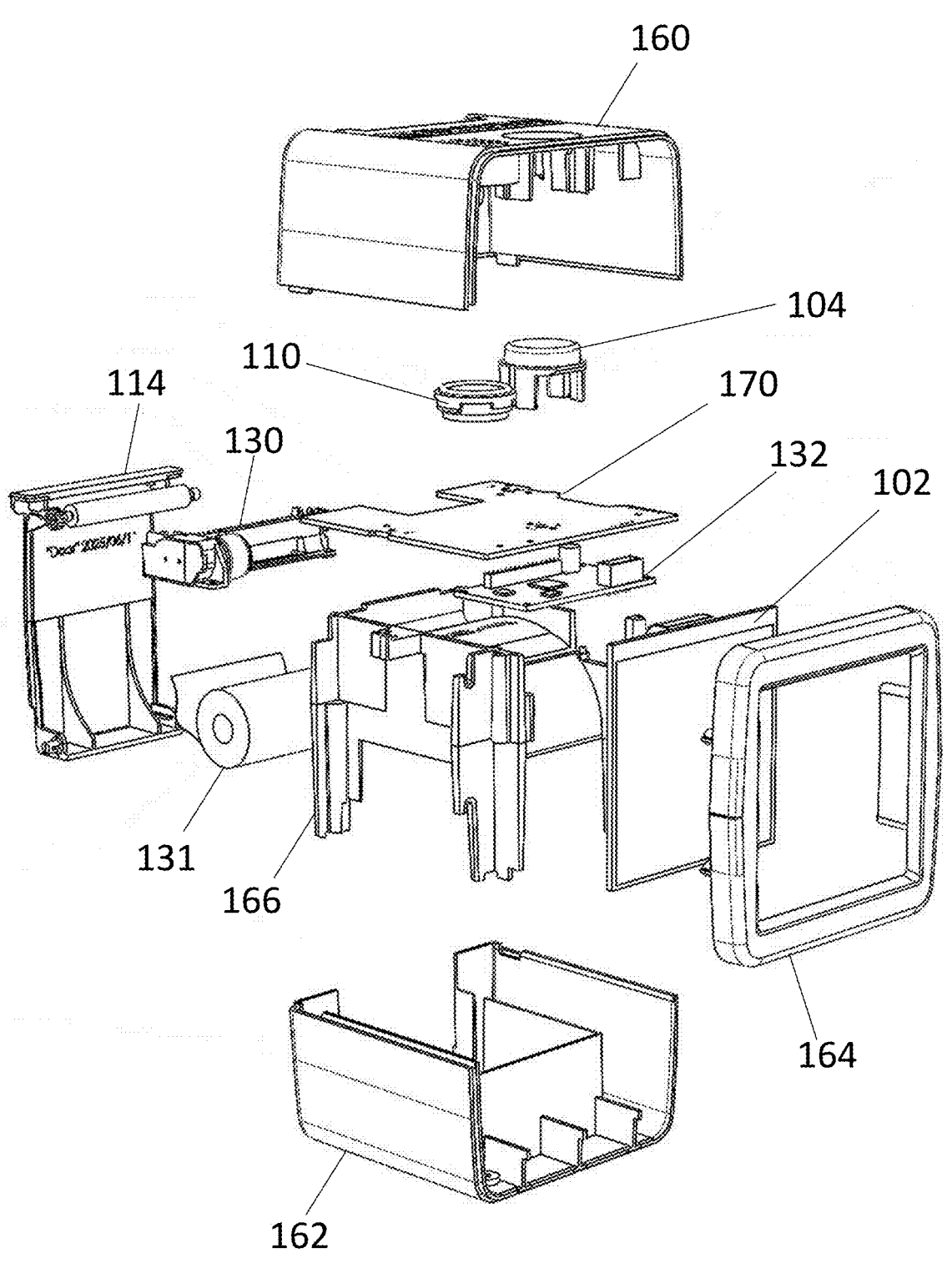
FIG. 1C illustrates a front exploded view of a device for printing customized stickers according to one embodiment of the present invention.
Figure 1D:
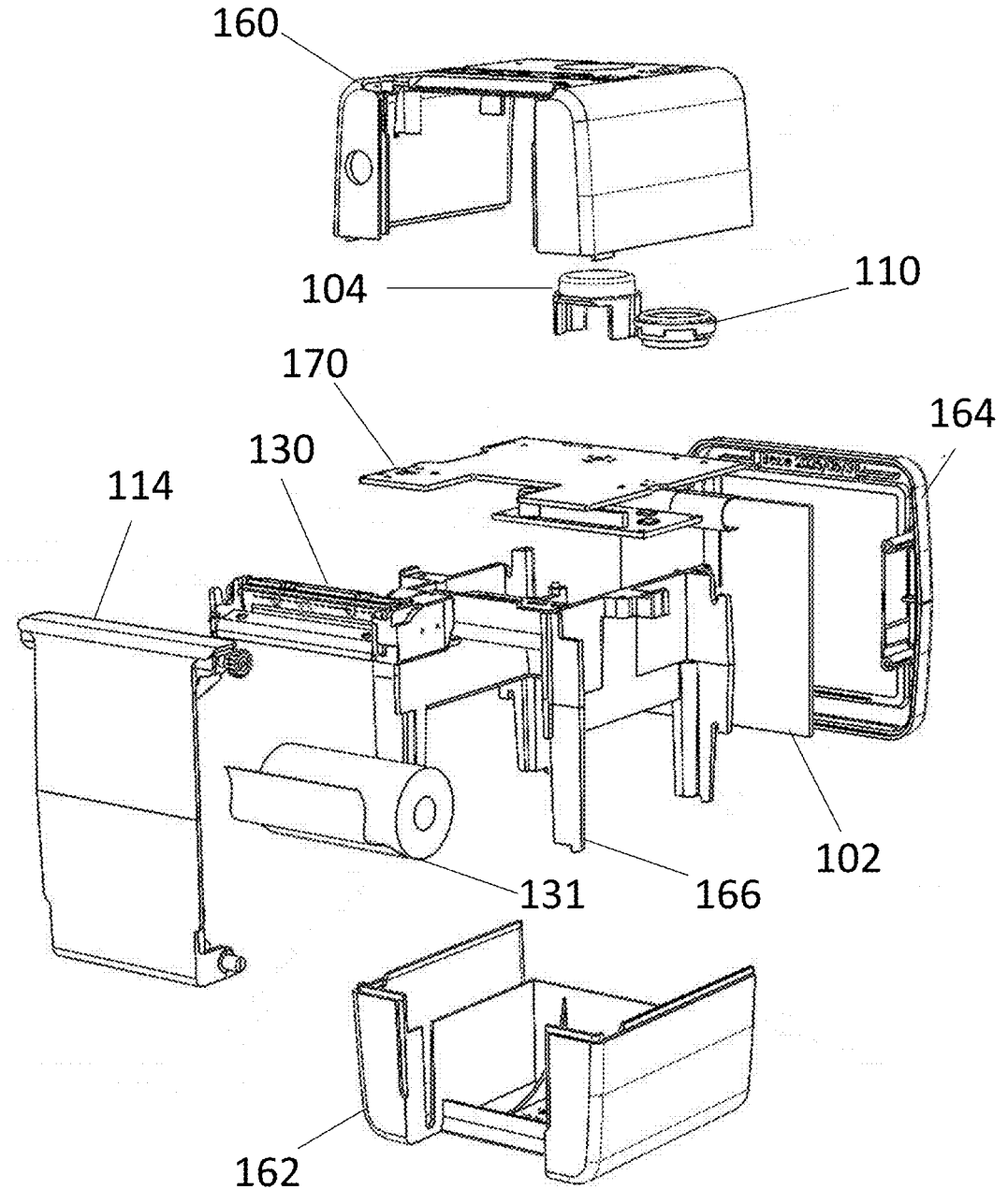
FIG. 1D illustrates a rear exploded view of a device for printing customized stickers according to one embodiment of the present invention.

FIGS. 1C and 1D show internal components and construction of the device according to one embodiment of the present invention. In one embodiment, the external shell of the device includes a plastic top 160, a plastic bottom 162, a front display bezel 164, and a rear panel 114. In one embodiment, the external shell also connects with a plastic inner frame 166 within the device. In the embodiment shown in FIGS. 1C and 1D, the plastic top 160 and the plastic bottom 162 directly connect (e.g., via snap connection, adhesive, latches, and/or other attachment means). The front bezel 164, which frames the edges of the display 102 then attaches to the combination of the plastic top 160 and plastic bottom 162. In one embodiment, the rear panel 114 is hingedly attached to the plastic 160 or the plastic bottom 162, allowing it to open as a door for access to restocking paper 131 for the thermal printer module 130. One of ordinary skill in the art will understand that the types of paper able to be used in the device are not intended to be limited, and that, in one embodiment, different types of paper rolls are able to be switched out depending on the needs of the user. The button 104 and the microphone 110 elements are positioned near the plastic top 160, though one of ordinary skill in the art will understand that other placements of the button 104 and microphone 110 are also contemplated herein. The plastic top 160 also includes an opening for the button 104 to extend through, allowing it to be pressed by the user. Electronic components of the device, such as a printed circuit board 170 and a printer driver board 132 and disposed within the device and able to interact with external input and output components, including the thermal printer module 130, the button 104, the microphone 110, speakers, and the display 102.

Figure 2:
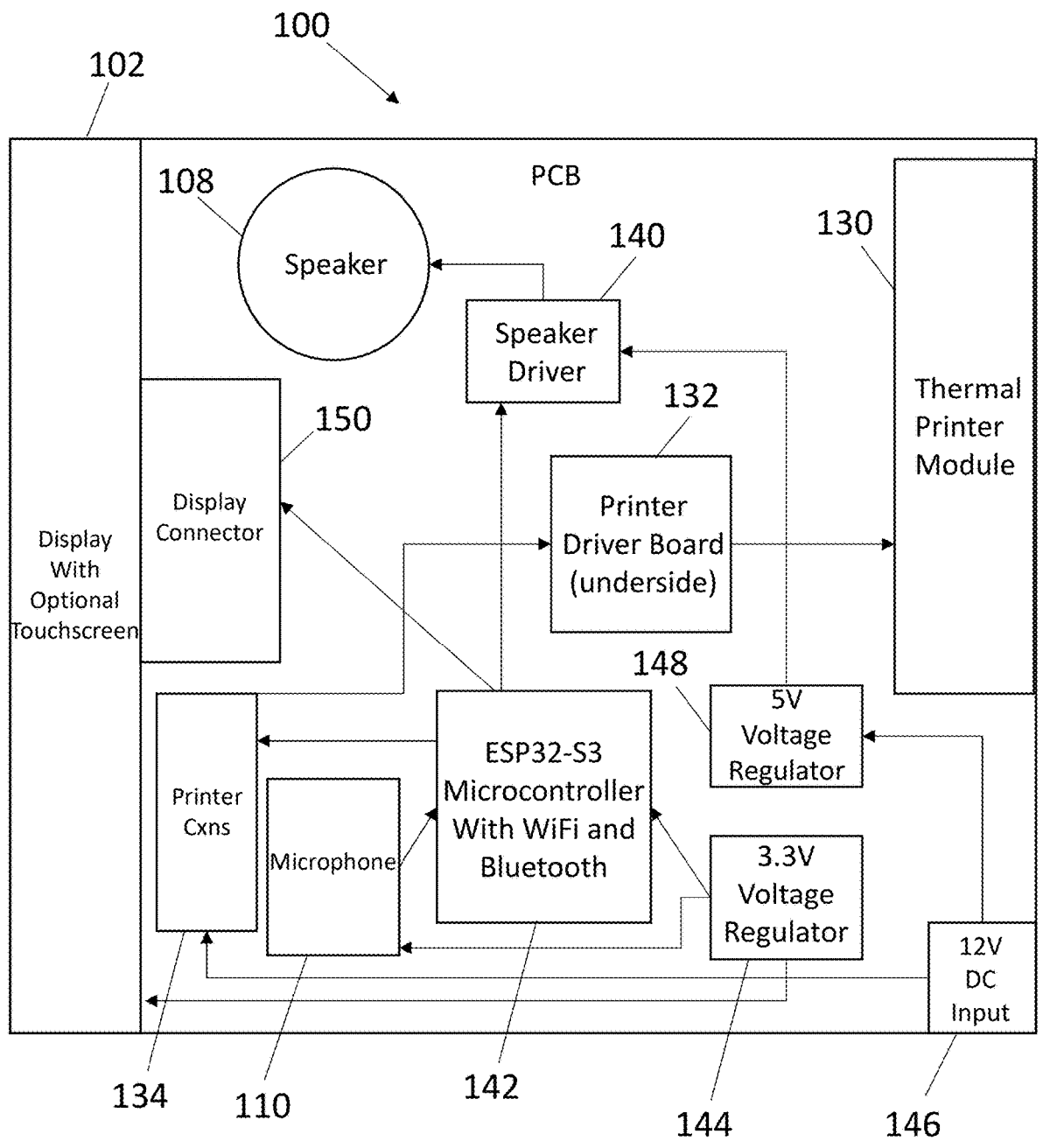
FIG. 2 shows a diagram of the internal hardware arrangement of the device according to one embodiment of the present invention.

FIG. 2 shows a diagram of the internal hardware arrangement of the device according to one embodiment of the present invention. In one embodiment, the device includes a microphone, a printer, a speaker, and a display (e.g., an LCD display) operable to function as a touch screen. In one embodiment, the device includes an integrated microphone to capture users' voice commands, translating both freeform speech and predefined prompts into textual instructions for artificial intelligence (AI)-based processing. In one embodiment, the a processor onboard the device and/or in communication with the device performs sentiment analysis of the voice commands to determine one or more associated emotional states of the user and utilizes the detected emotional state to inform generation of the image. In one embodiment, the device contains a thermal printer (e.g., a 203 dpi printer) capable of producing stickers with clear images on thermal sticker paper. In one embodiment, the stickers have dimensions of approximately 2-inch by 2-inch. The printer is optimized with firmware and mechanical design improvements to ensure clarity and reliability, minimizing jams and print errors.

The device 100 includes a thermal printer module 130 configured to print one or more images on one or more stickers loaded into the device 100. In one embodiment, the thermal printer module 130 is connected to a printer diver board 132, which is connected to a printer connections module 134 to a microcontroller 142 and a power source 146. In one embodiment, the microcontroller 142 includes onboard network communication modules to allow the device 100 to connect to one or more networks (e.g., WI-FI, BLUETOOTH, etc.). In one embodiment, the power source 146 is a 12V DC power source, but one of ordinary skill in the art will understand that the voltage rating of the device 100 is not intended to be limiting. In one embodiment, the power source 146 is connected to a first voltage regulator 148 (e.g., a 5V voltage regulator). In one embodiment, the first voltage regulator 148 is connected to a speaker driver 140 connected to a speaker 108. In one embodiment, the speaker driver 140 is connected to the microcontroller 142. In one embodiment, a second voltage regulator 144 (e.g., a 3.3V voltage regulator) is connected to the microcontroller 142 and the microphone 110 and/or the display 102.

In one embodiment, the microcontroller 142 is connected to the display 102 via at least one display connector 150.

Figure 3:
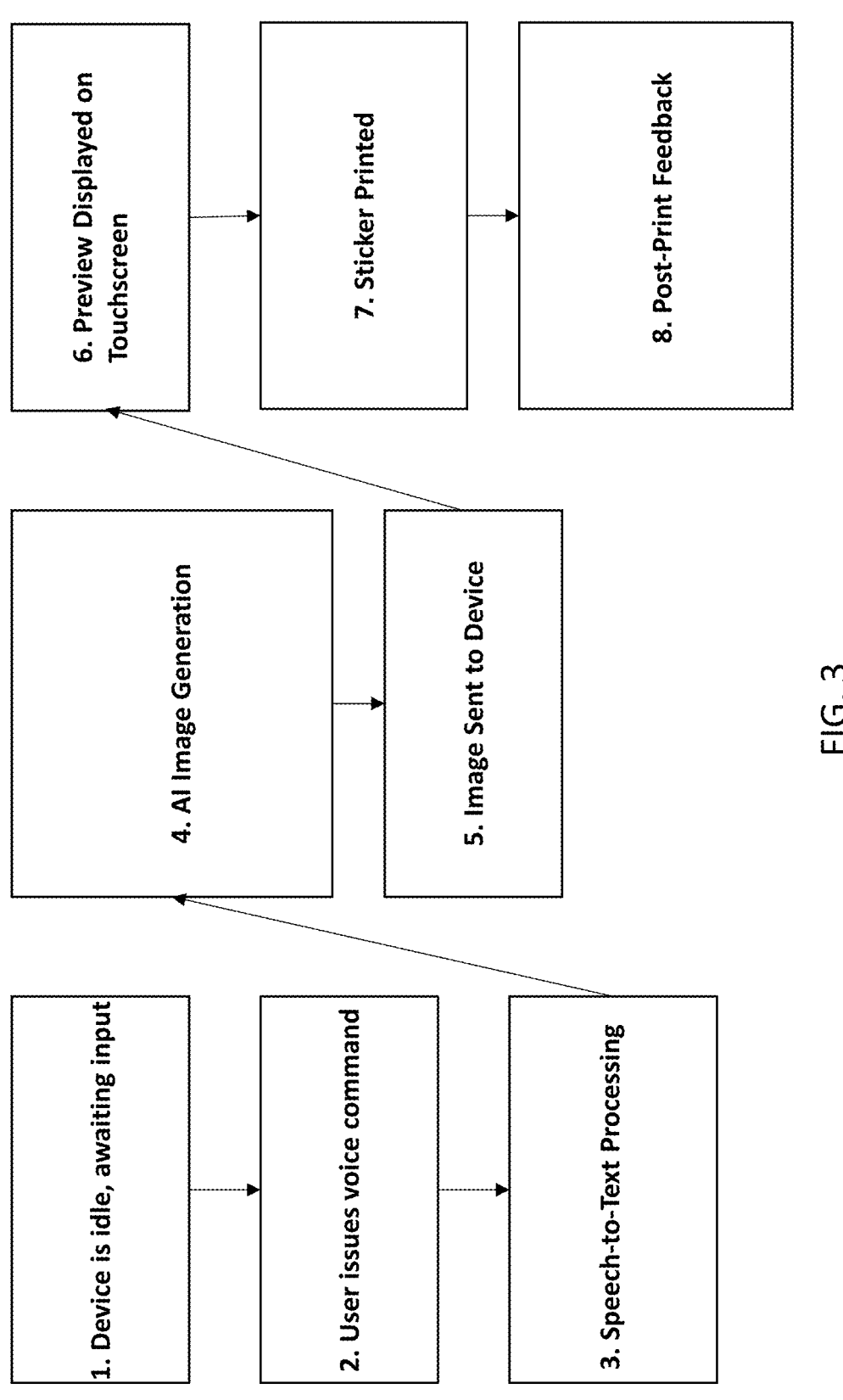
FIG. 3 is a diagram of an end-to-end sticker creation process according to one embodiment of the present invention.

FIG. 3 is a diagram of an end-to-end sticker creation process according to one embodiment of the present invention. The user speaks a command into the device, triggering cloud-based AI generation. In one embodiment, the resulting image is previewed on the display and is then printed using the thermal printer. In one embodiment, the device is operable to connect to cloud-based generative AI systems, capable of processing voice commands into customized images. The device incorporates proprietary algorithms for advanced personalization, dynamically integrating user-uploaded images into sticker designs and allowing indefinite cloud storage and reuse of user-created characters.

In a first step, the device is idle awaiting input. In this first step, the device is powered on and ready, but not yet actively taking action. In one embodiment, during the first step, a display on the device or an audio speaker provides a prompt (e.g., "say something to begin"). In a second step, the device receives a voice command from the user and captures the voice command with an integrated microphone. In an alternative second step, commands are able to be received by other means, such as by touchscreen input through the display or via communication with one or more connected user devices. Input in the second step describes what the image produced for the sticker should display (e.g., "a dragon surfing on lava").

The third step is the device using speech-to-text processing to determine what was said or otherwise input in the second step. In one embodiment, the device includes an onboard processor capable of natural language processing for audio data to determine what was said. In another embodiment, the device communicates via a network (e.g., WI-FI, Bluetooth, cellular, etc.) with at least one cloud-based server. The server then converts the audio data to text data via an artificial intelligence (AI)-based natural language processing (NLP) model, and the text data is then sent back to the device or to one or more other AI modules. Therefore, in one embodiment, the device of the present invention is capable of functioning, including generating an image without an internet connection and without network connection to any server or external processor.

In one embodiment, in a fourth step, after converting the audio input (or other input type) to text data, an AI-based image generation model is used to automatically generate an image matching the text data. In one embodiment, the AI-based image generation model includes a personalization layer operable to take into account particular saved characters or images from the same user in order to generate the image. In one embodiment, saved characters are assigned names by the user or by the device itself such that the character is able to be consistently referenced for future image generation, to produce characters with specific physical or other characteristics. In one embodiment, the image generated is a black-and-white image, while, in another embodiment, the image is a color image. In one embodiment, the AI-based image generation model is hosted on a cloud-based server that is the same or different from the cloud-based server used to generate the text data. In another embodiment, the AI-based image generation model is hosted on a processor of the device itself.

In a fifth step, the image generated by the AI-based image generation model is sent to the device, if it was originally generated at a cloud-based server. In a sixth step, the image is shown on a display of the device, and/or on a display of one or more connected devices (e.g., user devices). In one embodiment, the display (e.g., a 3.92" color display) of the device is a touchscreen display. In one embodiment, in a seventh step, the sticker (e.g., a 2"×2" sticker) is printed by the device. In one embodiment, the process first receives a confirmation input from the user (e.g., audio input, touchscreen selection, button input, etc.) before proceeding to the seventh step. In one embodiment, the eighth step includes the device or a separate device in network communication with the device providing a confirmation sound or light, showing that the sticker has been printed. In one embodiment, the sticker image is automatically saved in an internal memory of the device or in a database associated with the cloud-based server in communication with the device, such that the image is able to later be viewed, shared, or reprinted.

Figure 4:
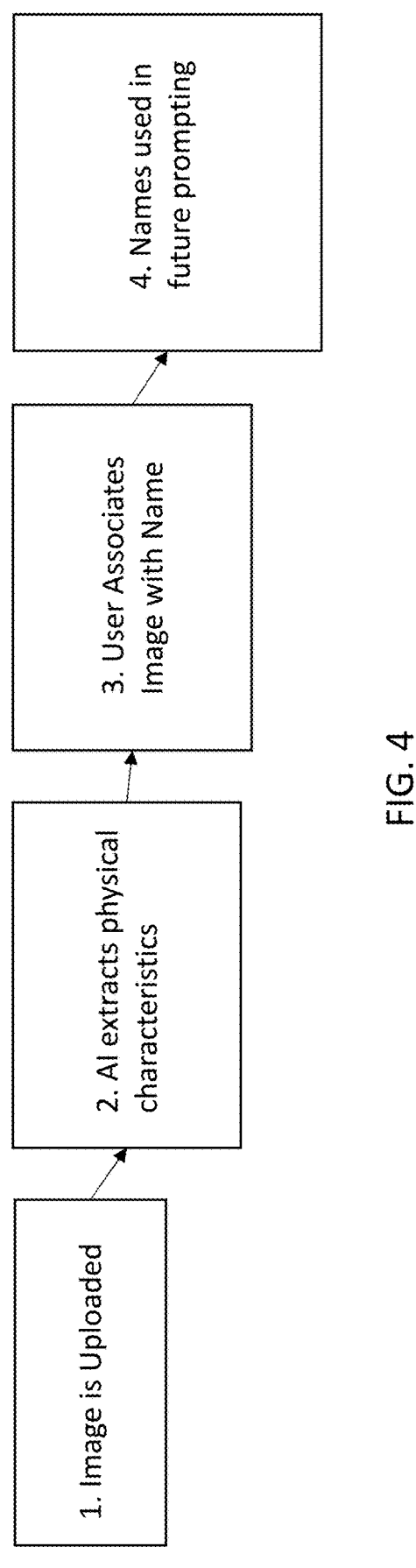
FIG. 4 illustrates a personalization process for images uploaded to a device according to one embodiment of the present invention.

FIG. 4 illustrates the personalization pipeline, showing how an image is uploaded, processed, and integrated into the AI-generated sticker output according to one embodiment of the present invention. Sticker images generated by the device are able to vary in style, content, and personalized elements that result from the device's cloud-based AI generation and personalization process.

In one embodiment, a first step of the personalization process includes uploading an image to a user device or to a server in communication with the device. In one embodiment, a vision-language AI model operating at the server, at the user device, or at the device then extracts relevant physical characteristics of one or more subjects (e.g., humans, animals, etc.) of the image such that this information is able to be used for future generation tasks. In one embodiment, the vision-language AI model includes contrastive language-image pre-training (CLIP), bootstrapped language-image pre-training (BLIP), or other models. In one embodiment, the user device, the device, or the cloud-based server provides input of a name to associate with the uploaded image such that the image (or the subject of the image) is able to be referenced in the future via future generation task inputs. In a final step, the name associated with the uploaded image is used in a future prompt to generate a personalized image for the user. One example of such a prompt is "show me as an astronaut," which is a command that necessarily only makes sense if the device is able to reference an image that provides an idea of what "me" means or looks like.

Figure 5:
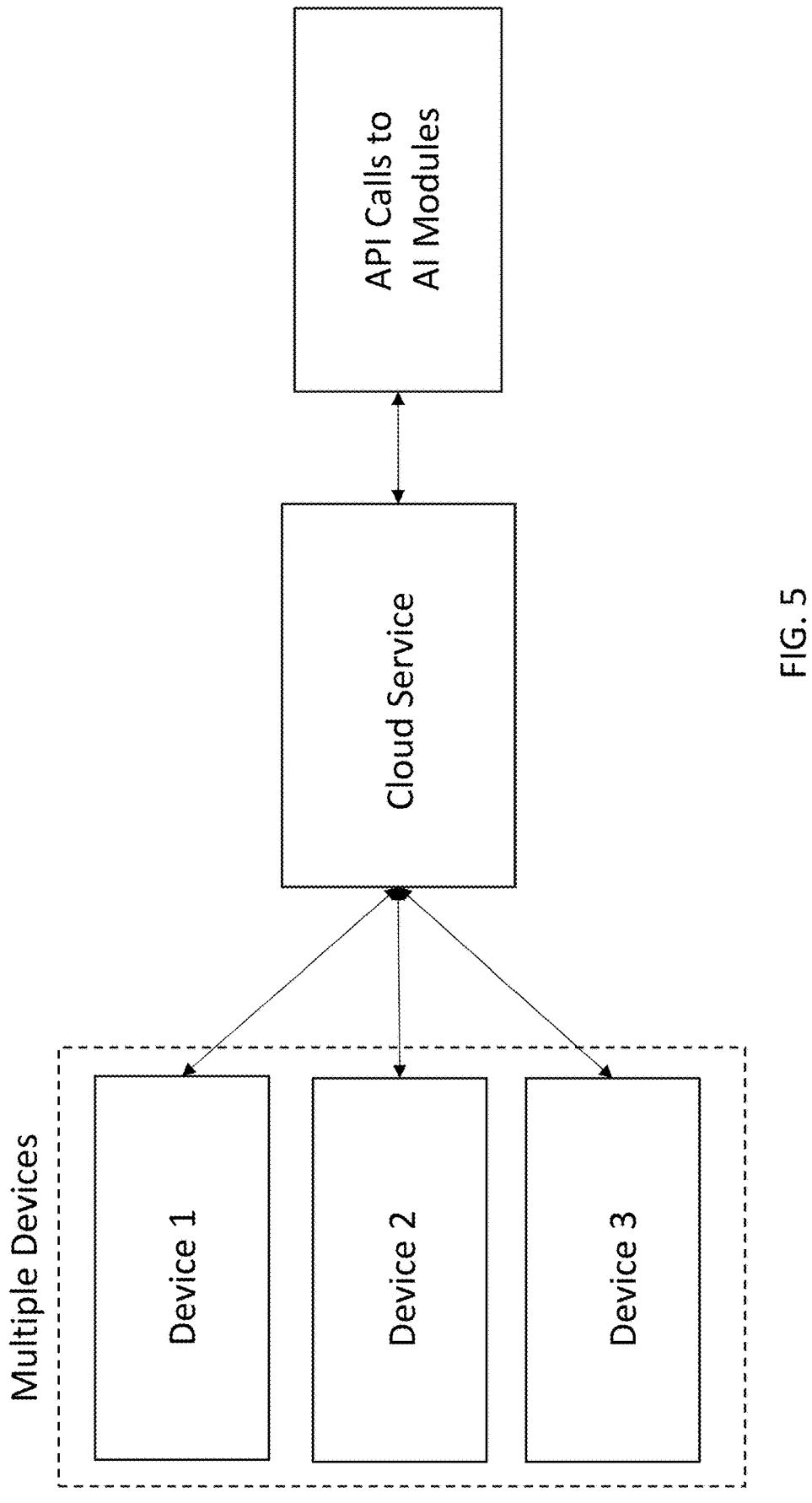
FIG. 5 illustrates a schematic diagram of device connectivity with one or more cloud services according to one embodiment of the present invention.

As shown in FIG. 5, the devices are able to communicate via standard internet protocols (e.g., Hypertext Transfer Protocol (HTTP)) with a proprietary online platform (e.g., StickerBox Studio) and companion applications, enabling sticker sharing, collaborative interactions, and subscription management. In one embodiment, the devices support inter-device sharing, fostering collaborative creative experiences. The device offers both software-based and physical premium features. Software-based features include color previews, pre-print confirmations, and uploaded image-based personalization. Physical premium features include specialty sticker paper (e.g., holographic foil, transparent stickers, etc.), and printing full-color sticker versions.

Figure 6B:
FIG. 6B illustrates the sticker of FIG. 6A after manual coloration by a user.
Figure 6A:
FIG. 6A illustrates a printed black and white sticker according to one embodiment of the present invention.

As illustrated in FIGS. 6A and 6B, the printed stickers are rendered in black-and-white to encourage user engagement through manual coloring. In one embodiment, each device is shipped with a set of colored pencils or markers, and the sticker images are designed to support creative embellishment and personalization. This post-print coloring step is integral to the user experience, enhancing emotional investment and fostering a physical connection with AI-generated content.

Printed content is also operable to include a series of images, such as a comic strip. In another embodiment, the medium upon which the device prints does not include an adhesive such that it is not a sticker.

One of ordinary skill in the art understands that the device is operable to include additional hardware and software not specified herein. In one embodiment, the device includes a camera operable to capture one or more images. In one embodiment, images generated by the device of the present invention, for display and/or printing, are able to include those captured by the camera. In one embodiment, images generated by the device of the present invention, for display and/or printing, include those incorporating images captured by the camera as input for generation of new images (e.g., a face captured by the camera is superimposed on or adapted to fit a cartoon character generated by the device, cartoon characters drawn by hand by the user, etc.). The one or more images are operable to be modified using AI based on user input. For example, a cartoon version of an object, animal, or person is operable to be created based on the image captured and user input. In another embodiment, the device includes an accelerometer operable to track motion and movement and create or modify an image based on the motion and/or movement.'

In one embodiment, the camera integrated with the device and/or a camera integrated with a separate user device in communication with the device is able to be used to track gestures, facial expressions, or other movements of the user. In one embodiment, the movements, facial expressions, or gestures of the user are able to be imitated by characters generated by the device. In another embodiment, the gestures, facial expressions, and/or movements of the user are able to be used to define the prompt itself. In this way, the device is able to utilize sign language (e.g., American Sign Language, British Sign Language, Chinese Sign Language, etc.) used by the user to define the user prompts used to generate the image. This allows for play with the device by non-vocal children and other users.

In one embodiment, the camera integrated with the device and/or a camera integrated with a user device connected with the device is operable to generate an image of the user's face. In one embodiment, access to the device is limited based on facial recognition of the user based on the camera data. In one embodiment, facial recognition is performed by one or more onboard processors of the device, one or more processors of a connected user device, and/or by one or more servers in network communication with the device.

In one embodiment, the device includes one or more haptic feedback components, operable to provide vibration response or other physical response as a result of user input or actions performed by the device. By way of example and not limitation, in one embodiment, while generating or shortly after generating an image, the device provides a vibration response. In one embodiment, the device or a component of the device provides haptic feedback in response to one or more user inputs in order to provide feedback that the input was successfully received. In one embodiment, a haptic feedback response is provided when the device connects or disconnects from one or more networks. In one embodiment, the device is capable of providing multiple distinct haptic feedback responses to provide distinct responses to different actions. For example, in one embodiment, a different haptic feedback response is provided in response to the device generating a new image versus the device successfully receiving a user input.

In one embodiment, multiple devices are operable to be connected in a network (e.g., wireless local area network, ethernet connection, cellular network, etc.) to encourage collaboration or game playing between the different devices, allowing for multiplayer engagement. In one embodiment, in a collaborative mode, one device receives input (e.g., voice input, text input, etc.) from a first user and generates a first image, then receives a second input from a second user to modify the first image or generate a second image related to the first image. For example, a first user says they want to see a dragon and an image of a dragon is generated, then the second user says "made of garbage" and the image and/or the prompt is edited to be an image of a dragon made of garbage. In one embodiment, the first image is deleted and replaced, while in another embodiment, the second prompt generates an additional image and the first image is not deleted. In one embodiment, the system receives multiple prompts from multiple different devices before the first image is generated and generates the first image based on those multiple prompts.

In one embodiment, in a sharing mode, one device is able to access memory of one or more other devices and utilize past images generated by those devices to generate the image requested by the primary user. For example, a user says "show the dragon generated by my friend's device fighting a knight" and the device accesses the other device in question to determine characteristics of the dragon being referenced in order to generate an image of that dragon fighting a knight. This allows for a continuity of visual imagery across devices possessed by a specific group for more engaging play.

The device is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The device is operable to use any of the aforementioned learning techniques alone or in combination.

Further, the device is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The device is preferably operable to recommend and/or perform actions based on historical data, external data sources, ML, AI, NNs, and/or other learning techniques. The device is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

In one embodiment, the device autonomously performs one or more actions (e.g., generating an image, printing a sticker, etc.) without receiving direct user feedback. In one embodiment, autonomous actions are performed at preset times of day (e.g., 6:00 AM in the morning), preset days of week, present days of the year, and/or other preset times or time intervals (e.g., every hour). In one embodiment, the autonomous actions are in response to sensor input or other data input regarding an external event (e.g., detecting the user has woken up, based on specific weather data, etc.). In one embodiment, the image generated is based on one or more basic themes or subjects preprogrammed onto the device, one or more themes or subjects preselected by a user, or based on audio data passively received for the previous data (e.g., the user and friends were talking about a cool new dinosaur yesterday). These autonomous actions provide a degree of spontaneity or habit that provides encouragement, wonder, or general entertainment even when the device is not directly being engaged with. In one embodiment, images generated and/or stickers printed are seasonal or focused on a particular holiday or celebration, providing engagement with a broader community.

In one embodiment, the device includes one or more near-field communication (NFC) chips and/or one or more radiofrequency identification (RFID) chips for recognition by one or more user devices (e.g., phones, tablets, etc.). In one embodiment, the device is operable to pair with one or more user devices based on recognition by the one or more user devices of the one or more NFC chips or one or more RFID chips in the device.

In one embodiment, a user device associated with one or more parent profiles is operable to connect to the device and provide one or more content limits to prevent generation of specific types of images (e.g., no blood). In one embodiment, the one or more parent profiles is operable to set limits on which individuals are able to use the device, with the limits implemented by one or more user verification systems (e.g., voice recognition, facial recognition, recognition of one or more associated user devices, etc.). In one embodiment, images generated by the device are automatically transmitted to a user device associated with the one or more parent profiles or transmitted upon request, such that the parent profile is able to monitor what images a child is generating. In one embodiment, an application on the user device is operable to automatically generate a summary of what types of images have been generated by the child over a period of time (e.g., 65% of images in the last month are related to dragons). This allows the parent to not only monitor for appropriate content, but also more accurately gauge interests of the child to inform gift-giving or other play activities.

Figure 7:
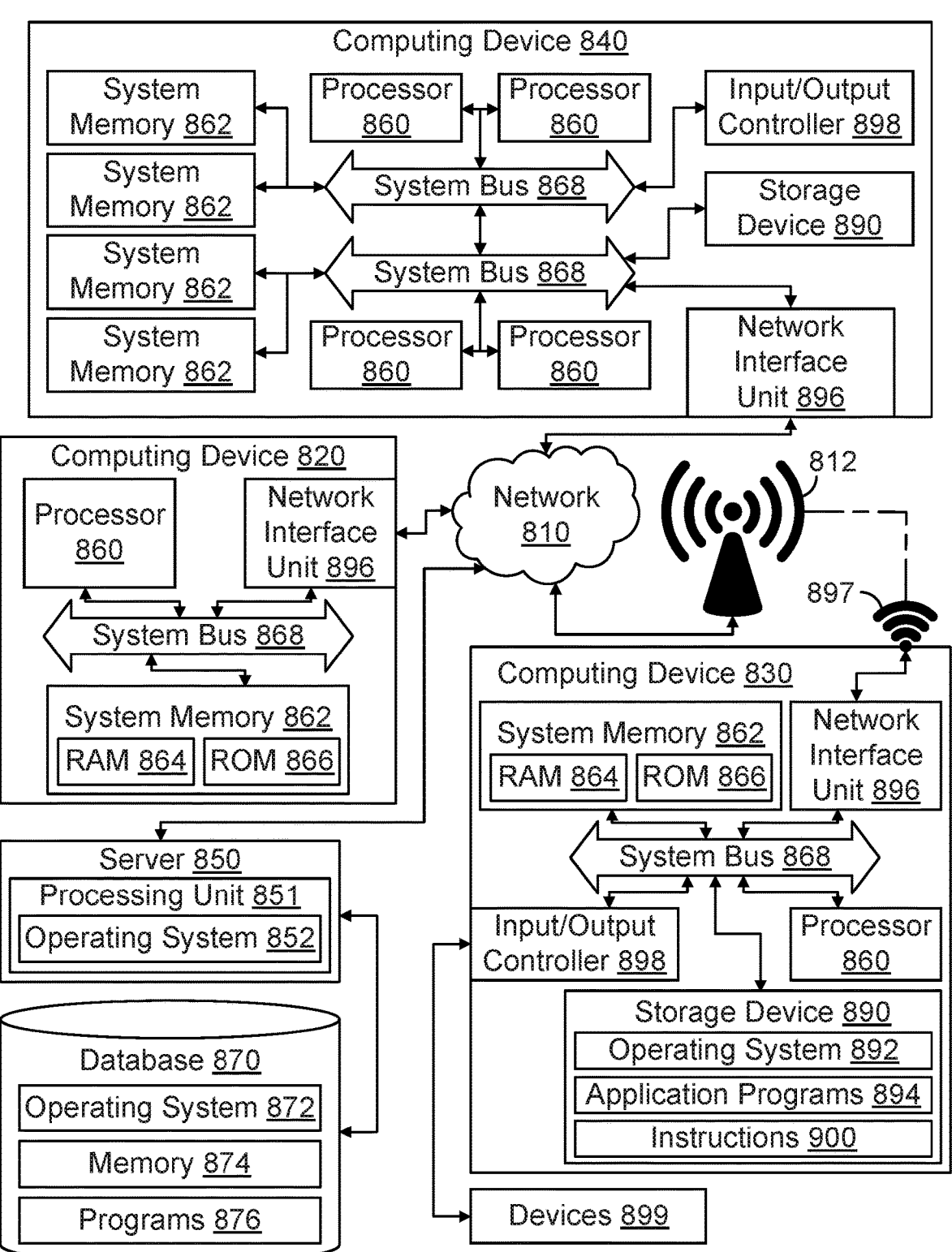
FIG. 7 is a schematic diagram of a system of the present invention.

FIG. 7 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICRO-WAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 7, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable to be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 7, is operable to include other components that are not explicitly shown in FIG. 7, or is operable to utilize an architecture completely different than that shown in FIG. 7. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A voice-controlled device, comprising:
   a housing;
   a microphone module within the housing configured to capture voice inputs including a voice command;
   a processor and a memory, wherein the processor and the memory are within the housing, and wherein the processor is configured to:
   receive the voice command from a user;
   provide the voice command to convert the voice command to text;
   receive the text;
   provide the text to generate an image, wherein the image is generated taking into account saved personalized characters or saved personalized images from the user;
   receive the image; and
   a thermal printer module, wherein the thermal printer module is within the housing, and wherein the thermal printer module is configured to:
   print one or more stickers, one or more printed sheets, or one or more stickers and one or more printed sheets including the image.

2. The device of claim 1, wherein a personalized character or a personalized image is saved associated the user.

3. The device of claim 2, wherein relevant physical characteristics of a subject of the personalized character or the personalized image are extracted and saved associated with the user for future personalized images.

4. The device of claim 2, wherein the personalized character or the personalized image is associated with a name enabling future referencing for image generation.

5. The device of claim 1, further comprising a camera, wherein the camera is configured to capture a device camera image.

6. The device of claim 5, wherein the device camera image is provided to generate the image.

7. The device of claim 1, wherein the image is generated taking into account saved personalized characters from another user or saved personalized images from the other user.

8. The device of claim 1, wherein the processor is further configured to receive a second request from a second user to modify the image or to generate a second image related to the image.

9. A method, comprising:

capturing, using a microphone module within a housing, voice inputs including a voice command;

receiving, using a processor, the voice command from a user;

providing the voice command to convert the voice command to text;

receiving the text;

providing the text to generate an image, wherein the image is generated taking into account saved personalized characters or saved personalized images from the user;

receiving the image; and printing, using a thermal printer module, one or more stickers, one or more printed sheets, or one or more stickers and one or more printed sheets including the image, wherein the thermal printer module is within the housing.

10. The method of claim 9, wherein a personalized character or a personalized image is saved associated the user.

11. The method of claim 10, wherein relevant physical characteristics of a subject of the personalized character or the personalized image are extracted and saved associated with the user for future personalized images.

12. The method of claim 10, wherein the personalized character or the personalized image is associated with a name enabling future referencing for image generation.

13. The method of claim 9, further comprising capturing, using a camera, a device camera image.

14. The method of claim 13, wherein the device camera image is provided to generate the image.

15. The method of claim 9, wherein the image is generated taking into account saved personalized characters from an other user or saved personalized images from the other user.

16. The method of claim 9, further comprising receiving a second request from a second user to modify the image or to generate a second image related to the image.

17. A computer program product embodied in a non-transitory computer readable medium and comprising computer instructions for:

capturing, using a microphone module within a device housing, voice inputs including a voice command;

receiving, using a processor, the voice command from a user;

providing the voice command to convert the voice command to text;

receiving the text;

providing the text to generate an image, wherein the image is generated taking into account saved personalized characters or saved personalized images from the user;

receiving the image; and printing, using a thermal printer module, one or more stickers, one or more printed sheets, or one or more stickers and one or more printed sheets including the image, wherein the thermal printer module is within the housing.

18. The computer program product of claim 17, wherein a personalized character or a personalized image is saved associated the user.

19. The computer program product of claim 18, wherein relevant physical characteristics of a subject of the personalized character or the personalized image are extracted and saved associated with the user for future personalized images.

20. The computer program product of claim 18, wherein the personalized character or the personalized image is associated with a name enabling future referencing for image generation.

* * * * *